June 3, 1969

J. RAYNAL ET AL 3,448,305

APPARATUS FOR PRODUCING AND UTILISING ELECTRICAL ENERGY FOR
USE IN DRILLING OPERATIONS

Filed Oct. 11, 1966

INVENTORS
SERGE GSTALDER
JEAN RAYNAL
CLAUDE QUICHAUD

BY Bacon & Thomas

ATTORNEYS

United States Patent Office 3,448,305
Patented June 3, 1969

3,448,305
APPARATUS FOR PRODUCING AND UTILISING ELECTRICAL ENERGY FOR USE IN DRILLING OPERATIONS
Jean Raynal and Serge Gstalder, Pau, and Claude Quichaud, Billiere, France, assignors to Societe Nationale des Petroles d'Aquitaine, Paris, France
Filed Oct. 11, 1966, Ser. No. 585,955
Int. Cl. H02k 7/00, 33/00, 35/00
U.S. Cl. 310—17                5 Claims

ABSTRACT OF THE DISCLOSURE

An apparatus for producing and utilising electrical energy associated with a well drilling rig in which a rotary drilling stem drives a rotary drilling tool that is subjected in the course of drilling to axial vibrations. The connection between the drilling stem and the drilling tool includes a hollow housing and a cylindrical member axially movable in the housing. The housing and cylindrical member comprise a generator system including an inductor and an armature. The output of the generator is supplied to a means capable of utilising the electrical energy developed by the housing and cylindrical member.

---

Figure 1:
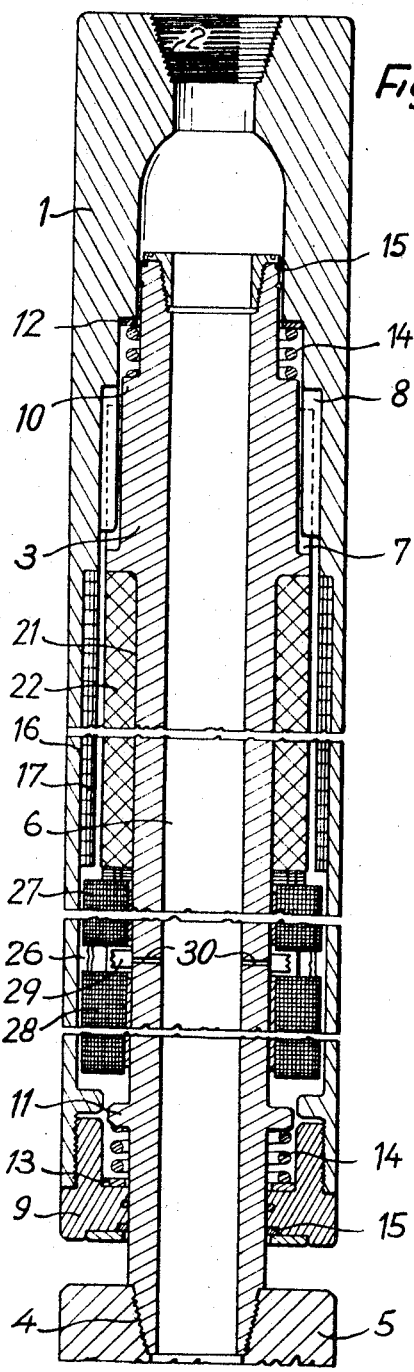

The present invention relates to apparatus which can be used in drilling operations, where the tool is subjected to longitudinal vibrations, and is particularly intended for converting the energy which they dissipate into an energy which can be used for improving the operation of the tool and/or feeding a device which can measure and transmit parameters concerning the tool or the rock at the bottom of the well during drilling.

Experience has shown that in drilling operations effected with rotary apparatus, a considerable part of the energy transmitted by the drive rods of the tool is dissipated into longitudinal vibrations.

These vibrations influence the performances of the drilling operation which varies according to the type of tool used. In the case of a drilling tool having a diamond head, these vibrations have a disastrous influence and, in the case of knurled tools, they could be beneficial only if they were mastered by the driller, but this is not the case at the moment.

It is an object of the present invention to produce an apparatus which permits the energy of these vibrations to be used for measuring and controlling purposes in order to improve the performances of the tools, and at the same time to dampen these vibrations in order to reduce the harmful consequences produced thereby.

Up to the present time, there has been no apparatus which could accomplish these two operations simultaneously, although German patent specification No. 631,398 and United States patent specification No. 2,756,022 disclose drilling apparatus having an elastic connection between the tool and the base of the set of rods, for the purpose of damping the shocks passed from the tool to these rods in the axial direction.

Drilling apparatus are also known in which an electric energy producing device is located at the base of the set of rods, for the purpose of measuring various characteristics, such as the speed of rotation of the tool, the resistivity of the ground, etc. French patent specification No. 1,253,711 discloses a device of this type for a turbine drilling machine and United States patent specification No. 2,890,019 describes the use of the relative rotational movement of the base of the set of rods and of a stabilising sleeve rubbing against the wall of the probing hole, for the purpose of producing electrical energy.

In the case of the present invention, it is the relative axial displacement of the tool, with respect to the set of rods, which it is proposed to use, and to this end there is provided in the drilling machine itself and near the tool, an apparatus which transforms one part of the mechanical energy of these vibrations into electrical energy, intended to supply an additional device, such as a measuring apparatus positioned near the tool, and a telemetering transmitter, the generator thus formed also being able to act as a damping means if it is made to feed either an electromagnetic braking device, or a passive load.

To this end, the object of the present invention is to provide an apparatus for producing and utilising electrical energy for a well drilling rig in which the hollow rods drive a drilling tool which is normally subjected during well drilling operations to axial vibrations, characterised in that the coupling between the hollow rods and the drilling tool includes a hollow housing and a cylindrical member axially movable in the housing, a generator is formed by an inductor and an armature mounted on the housing and cylindrical member, and coupling means to carry the electrical energy produced by the generator to a utilisation device.

In one embodiment of the connection between the tool and the set of rods, the tool is surmounted by a rod which is guided in a sealed manner into the lower end of the set of rods, which comprises on its inside, two stops for limiting the axial upward and downward travel of the tool, by means of two elastic components connected between these stops, and two corresponding shoulders of the rod surmounting the tool.

An embodiment of the electric current generator device, comprises a cylindrical inductor fixed in the internal wall of the set of rods, constituted by an alternate superposition of annular magnetic pole faces of opposite polarity, and a cylindrical armature fixed to the rod surmounting the tool, and located opposite said inductor, constituted by a magnetic face provided with recesses in which conductors are wound.

In another embodiment of the electric current generator device, the inductor is integral with the rod surmounting the tool and the armature is carried by the internal wall of the set of rods.

Figure 2:
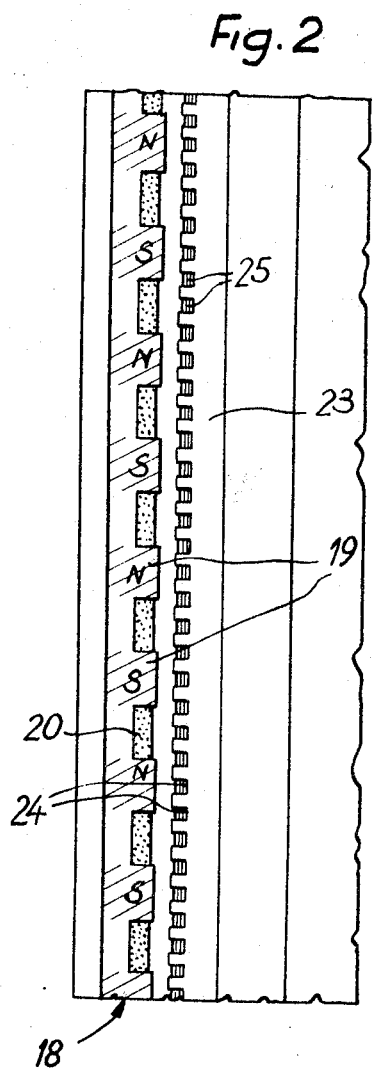

In order that the invention may be more clearly understood, reference will now be made to the accompanying drawings which show one embodiment, by way of example, and in which:

FIGURE 1 is an elevational view cut along a diametrical plane of the assembly of the lower end of the set of rods and the tool, and the equipment which is associated therewith, and FIGURE 2 is a sectional view, to a larger scale than that of FIGURE 1, of an embodiment of the current generator.

Referring now to the drawings, the sectional view of FIGURE 1 shows the assembly of a hollow cylindrical body 1 securable by a tapered thread 2 to the lower end of a conventional set of rods forming a rotary drilling stem (not shown) of a drilling machine of the rotary type, and of a hollow rod 3 connected by a tapered thread 4, to an actual drilling tool 5, or to a set of rods and pole faces (not shown), itself connected to the drilling tool 5. The swarf arrives at the tool 5 through the inside of the set of rods and the cylindrical body 1 and through an internal cylindrical channel 6 to the hollow rod 3.

The hollow rod 3 is mounted to slide in the axial direction inside the cylindrical body 1, by means of a set of grooves 7, engaged in an identical set of grooves 8, formed in the internal wall of the cylindrical body 1, these grooves being intended to render integral in rotation the cylindrical body 1 and the hollow rod 3 surmounting the tool 5 or the rods and pole faces connecting the rod 3 to the tool 5, whilst leaving them free to move axially with respect to one another.

The lower part of the cylindrical body 1 is normally closed by a threaded cap 9 which is hermetically screwed into the body 1, and which allows the base of the hollow rod 3 to pass. This cap 9 is intended to facilitate the dismounting of the assembly of the body 1 and the rod 3.

The hollow rod 3 has, not far from its ends, two shoulders 10 and 11 which are intended to limit the upward and downward axial travel of the hollow rod 3, with respect to the cylindrical body 1.

To these two shoulders 10 and 11 there correspond, inside the cylindrical body 1 and the threaded cap 9 respectively, two stops 12 and 13; two strong helical springs 14 are arranged between the shoulder 10 and the stop 12, and between the shoulder 11 and the stop 13, the force of these springs 14 being such that the hollow rod 3 is substantially in the middle of its axial travel with respect to the body 1, when the probing unit is suspended under its own weight without contact with the bottom of the well.

Finally, two sealing devices 15 are provided in order to ensure the sealed sliding of the ends of the hollow rod 3 into the cylindrical body 1, and the cap 9, thus preventing the swarf from penetrating between the hollow rod 3 and the inside of the cylindrical body 1.

On the internal face of the cylindrical body 1, there is fixed in a cylindrical housing 16, an inductor 17 constituted by an annular magnetic face 18, formed by a superposition of alternately north and south pole faces 19 (FIGURE 2). These pole faces 19 are provided by permanent magnets, the space between poles being occupied by a non-magnetic material 20.

In a modification, these pole faces 19 are made of magnetic metal, the space between the poles being occupied by inductor coils supplied by an independent voltage source, or from the armature of the generator itself, the remanence of the magnetic face 18 permitting in this latter case the generator to be started up.

Around the hollow rod 3 there is arranged a housing having cylindrical lateral walls 21, intended to receive an armature 22 having the same height as the inductor 17, from which it is separated by an annular air gap. When the hollow rod 3 is in the middle of its travel with respect to the hollow body 1, the end edges of the armature 22 coincide with the end edges of the inductor 17.

This armature 22 is constituted by a magnetic metal face 23 provided with recesses 24 in which are lodged conductors 25 formed by insulated wires or bars, wound in a conventional manner as in rotary electrical machines.

Beneath the generator formed by the inductor 17, and the armature 22, there is provided a free space 26 in which a means for utilising the energy produced by this generator, can be lodged.

FIGURE 1 schematically shows a voltage converter 27 and a measuring and transmission equipment 28, both secured to the hollow rod 3 and located in the free space 26.

Finally, the remaining space between the internal wall of the cylindrical body 1, and the external wall of the hollow rod 3, limited in height and depth by the sealing devices 15, is filled with a dielectric fluid, which is maintained at the pressure of the mud circulating inside the hollow rod 3, with the aid of diaphragm devices 29, one face of which is bathed by the dielectric fluid and the other by the swarf arriving at its contact through channels 30.

During drilling, the longitudinal vibrations which are undergone by the tool 5 and the set of rods and pole faces, which is possibly connected thereto, are transmitted to the hollow rod 3 which is moved alternately in the longitudinal direction with respect to the cylindrical body 1 secured to the set of rods rotating the tool. This relative movement produces an electrical voltage in the generator formed by the inductor 17 and the armature 22, and this voltage can be used directly or indirectly.

Firstly, with a direct usage, in the case where the inductor field is constant, the voltage supplied by the generator then being proportional to the speed of displacement of the tool; it is thus possible to use this voltage in order to represent the displacements of the tool; the generator thus operates as a pick up. However, this application necessitates only a small part of the energy which can be supplied by said generator, the rest of this energy being available for other applications.

The energy supplied by the generator may on the other hand be used for supplying an electrical equipment. However, it is firstly necessary to transform the voltage supplied by the generator into a D.C. voltage or into a sinusoidal voltage, in order to be able to use it for this purpose. This is effected by the electronic converter 27 which thus permits the indirect utilisation of the energy supplied by the generator.

The measuring and transmission equipment 28 which can be fed by the described device, may be constituted by an assembly of associated electronic circuits, either with strain gauges, or with suitable pickups, permitting the different amounts affecting the tool to be measured.

It includes on the other hand, a transmitter of the indications from the measuring apparatus to the surface, which can consist of an ultrasonic transmitter or a slow or rapid pulse generator in the swarf.

Moreover, the electrical generator formed by the inductor 17 and the armature 22, constitutes in itself a longitudinal vibration damper when it feeds its current into any load. It may in certain cases, be used solely for this purpose when it is made to feed either an electrical brake or a passive load.

The passive load will be as low as possible in order that the discharged current is as high as possible, the electrical energy supplied by the generator being entirely dissipated in the form of heat.

The damping effect may be increased by causing the generator to feed an electrical brake, effected simply by a coil secured to the cylindrical body 1 and a ferromagnetic core secured to the hollow rod 3.

These two applications represent another direct use of the energy of the generator, without passing through the converter 27.

Be that as it may, even when the generator feeds an electrical measuring and transmission equipment, a considerable damping effect is obtained.

We claim:

1. An apparatus for producing electrical energy for a drilling rig having a set of rods driving a drilling tool which is subjected in the course of drilling operations to axial vibrations, including a hollow cylindrical body and a hollow rod secured to said drilling tool and said rods, said rod being axially movable in said housing, and a generator having an inductor and an armature mounted to said cylindrical housing and said hollow rod, and means connecting said generator output to a utilisation device whereby axial vibrations are damped.

2. Apparatus according to claim 1, wherein said tool is surmounted by a rod, said rod being guided in a sealed manner into the lower end of said set of rods, two stops on the interior of said rod for limiting the upward and downward axial travel of said tool, by means of two elastic components connected between said stops and two corresponding shoulders of said rod surmounting said tool respectively.

3. Apparatus according to claim 2, wherein said electric current generator comprises a cylindrical inductor secured to the internal wall of said set of rods, and constituted by an alternate superposition of annular magnetic pole faces of opposite polarity, and a cylindrical armature secured to said rod surmounting said tool, and located opposite said inductor, constituted by a magnetic face provided with recesses in which electrical conductors are wound.

4. Apparatus according to claim 2, wherein said inductor is secured to said rod surmounting said tool and said armature is carried by the internal wall of said set of rods.

5. Apparatus according to claim 1, wherein the remaining free space between said rod surmounting said tool and the internal wall of said set of rods is filled with a dielectric fluid, permanently maintained at the pressure of the mud in the internal channel of said rods and said tool, during use, with the aid of a deformable diaphragm separating said dielectric fluid and the mud at at least one point of said rod surmounting said tool.

References Cited

UNITED STATES PATENTS

| | | | |
|---|---|---|---|
| 2,868,507 | 1/1959 | Scott et al. | 318—119 XR |
| 3,105,153 | 9/1963 | James | 322—3 XR |
| 2,944,160 | 7/1960 | Dickinson | 310—15 XR |
| 2,977,573 | 3/1961 | Mott | 340—14 |
| 2,890,019 | 6/1959 | Arps | 175—325 XR |
| 3,074,492 | 1/1963 | Clewell | 175—56 |
| 3,103,603 | 9/1963 | Reutter | 310—15 XR |
| 3,129,347 | 4/1964 | Tognola | 310—15 |
| 3,058,649 | 10/1962 | Plégut | 310—18 XR |
| 3,149,254 | 9/1964 | Carter et al. | 310—15 XR |

FOREIGN PATENTS 948,942   2/1964   Great Britain.

MILTON O. HIRSHFIELD, *Primary Examiner.*

B. A. REYNOLDS, *Assistant Examiner.*

U.S. Cl. X.R.

175—104; 310—27